(12) United States Patent
   Kasic

(10) Patent No.: US 9,695,774 B2
(45) Date of Patent: Jul. 4, 2017

(54) CYLINDER HEAD WITH SENSOR SLEEVE

(71) Applicant: Caterpillar Motoren GmbH & Co. KG, Kiel (DE)

(72) Inventor: Armin Kasic, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 108 days.

(21) Appl. No.: 14/424,355

(22) PCT Filed: Aug. 27, 2013

(86) PCT No.: PCT/EP2013/002582
   § 371 (c)(1),
   (2) Date: Feb. 26, 2015

(87) PCT Pub. No.: WO2014/032799
   PCT Pub. Date: Mar. 6, 2014

(65) Prior Publication Data
   US 2015/0219040 A1    Aug. 6, 2015

(30) Foreign Application Priority Data

Aug. 31, 2012   (EP) .................................. 12182639

(51) Int. Cl.
   *F02F 1/24*     (2006.01)
   *F02B 77/08*    (2006.01)
   *B23P 11/02*    (2006.01)
   *F02D 41/14*    (2006.01)

(52) U.S. Cl.
   CPC ............... *F02F 1/24* (2013.01); *B23P 11/025* (2013.01); *F02B 77/085* (2013.01); *F02D 41/1439* (2013.01); *Y10T 29/4927* (2015.01)

(58) Field of Classification Search
   CPC ....... F02F 1/24; F02D 41/1439; B23P 11/025; F02B 77/085; Y10T 29/4927
   USPC ..................................................... 123/193.5
   See application file for complete search history.

(56) References Cited

U.S. PATENT DOCUMENTS

| 4,882,829 A | * | 11/1989 | Dawe | .................. | B25B 27/0035 |
| | | | | | 123/188.3 |
| 4,907,333 A | * | 3/1990 | Dawe | .................. | B25B 27/0035 |
| | | | | | 123/188.3 |
| 4,967,458 A | * | 11/1990 | Rosenberg | ................ | B23P 6/00 |
| | | | | | 228/119 |
| 6,973,820 B2 | | 12/2005 | Watarai et al. | | |
| 2003/0177821 A1 | * | 9/2003 | Jonsson | .................. | F02B 77/08 |
| | | | | | 73/114.79 |

(Continued)

FOREIGN PATENT DOCUMENTS

| CN | 101956624 | 1/2011 |
| CN | 1025977631 | 7/2012 |

(Continued)

OTHER PUBLICATIONS

European Search Report dated Feb. 4, 2013.
International Search Report dated Dec. 6, 2013.

*Primary Examiner* — Marguerite McMahon

(57) ABSTRACT

A cylinder head of an internal combustion engine may include an opening and a sensor sleeve. The opening may extend through the cylinder head. The sensor sleeve may be shrink fitted in the opening. The sensor sleeve may be configured to receive a sensor. The sensor may be mounted within the sensor sleeve through a mounting mechanism.

18 Claims, 2 Drawing Sheets

(56) References Cited

U.S. PATENT DOCUMENTS

| | | | |
|---|---|---|---|
| 2007/0039592 A1* | 2/2007 | Kull | F02M 61/14 123/470 |
| 2007/0289370 A1 | 12/2007 | Hirose et al. | |
| 2008/0236899 A1* | 10/2008 | Oxford | E21B 10/18 175/339 |
| 2009/0126472 A1 | 5/2009 | Hirose et al. | |
| 2012/0198924 A1* | 8/2012 | Last | G01L 19/04 73/114.18 |
| 2012/0255961 A1* | 10/2012 | Masson | C22C 47/00 220/639 |

FOREIGN PATENT DOCUMENTS

| | | |
|---|---|---|
| DE | 19680912 | 4/2001 |
| DE | 102010048464 | 4/2012 |
| FR | 2656247 | 6/1991 |
| JP | 2009144702 | 7/2009 |
| WO | WO 2014/032799 | 3/2014 |

* cited by examiner

CYLINDER HEAD WITH SENSOR SLEEVE

CLAIM FOR PRIORITY

This application is a U.S. National Phase entry under 35 U.S.C. §371 from PCT International Application No. PCT/EP2013/002582, filed Aug. 27, 2013, which claims benefit of priority of European Patent Application No. 12182639.0, filed Aug. 31, 2012, all of which are incorporated herein by reference.

TECHNICAL FIELD

The present disclosure generally refers to a cylinder head of an internal combustion engine and more particularly to a cylinder head with a sensor sleeve.

BACKGROUND

To monitor and control operation of internal combustion engines, one or more sensor may be arranged at suitable position of the internal combustion engine. Those sensors monitor operating conditions of the internal combustion engine such as pressure and/or temperature values, for example, within each cylinder of the internal combustion engine.

A sensor may be provided within a cylinder head covering a cylinder liner. The sensor may sense operating conditions such as combustion temperature and/or combustion pressure within the cylinder during operation of the internal combustion engine.

For example, DE 10 2010 048 464 A1, discloses a pressure sensor arranged in a sensor shaft of the cylinder head. Specifically, an outer thread of the sensor may be screwed into an inner thread of the sensor shaft to mount the sensor in the cylinder head.

Machining of a sensor seat and a thread within a sensor shaft extending through a cylinder head may require expensive special tooling and may be difficult and complex to machine.

As a further example, US 2009/0126472 A1 discloses a combustion pressure sensor having a housing with a fixing functional member fixed to an engine head.

FR 2 656 247 A1 discloses a flexible device for fitting refrigerated inserts such as valve seats and valve guides in a cylinder head of an internal combustion engine.

The present disclosure is directed, at least in part, to improving or overcoming one or more aspects of prior systems.

SUMMARY OF THE DISCLOSURE

According to an aspect of the present disclosure, a cylinder head of an internal combustion engine may comprise an opening. The opening may extend through the cylinder head. The cylinder head may further comprise a sensor sleeve. The sensor sleeve may be shrink fitted in the opening.

According to another aspect of the present disclosure, an internal combustion engine may comprise at least one cylinder unit. Each cylinder unit may have a cylinder head. The cylinder head may comprise an opening. The opening may extend through the cylinder head. The cylinder head may further comprise a sensor sleeve. The sensor sleeve may be shrink fitted in the opening.

According to another aspect of the invention, a method for manufacturing a cylinder head of an internal combustion engine may comprise, providing an opening extending through the cylinder head. The method may further comprise, providing a sensor sleeve, and shrink fitting the sensor sleeve into the opening of the cylinder head.

Other features and aspects of this disclosure will be apparent from the following description and the accompanying drawings.

DETAILED DESCRIPTION

Figure 1:
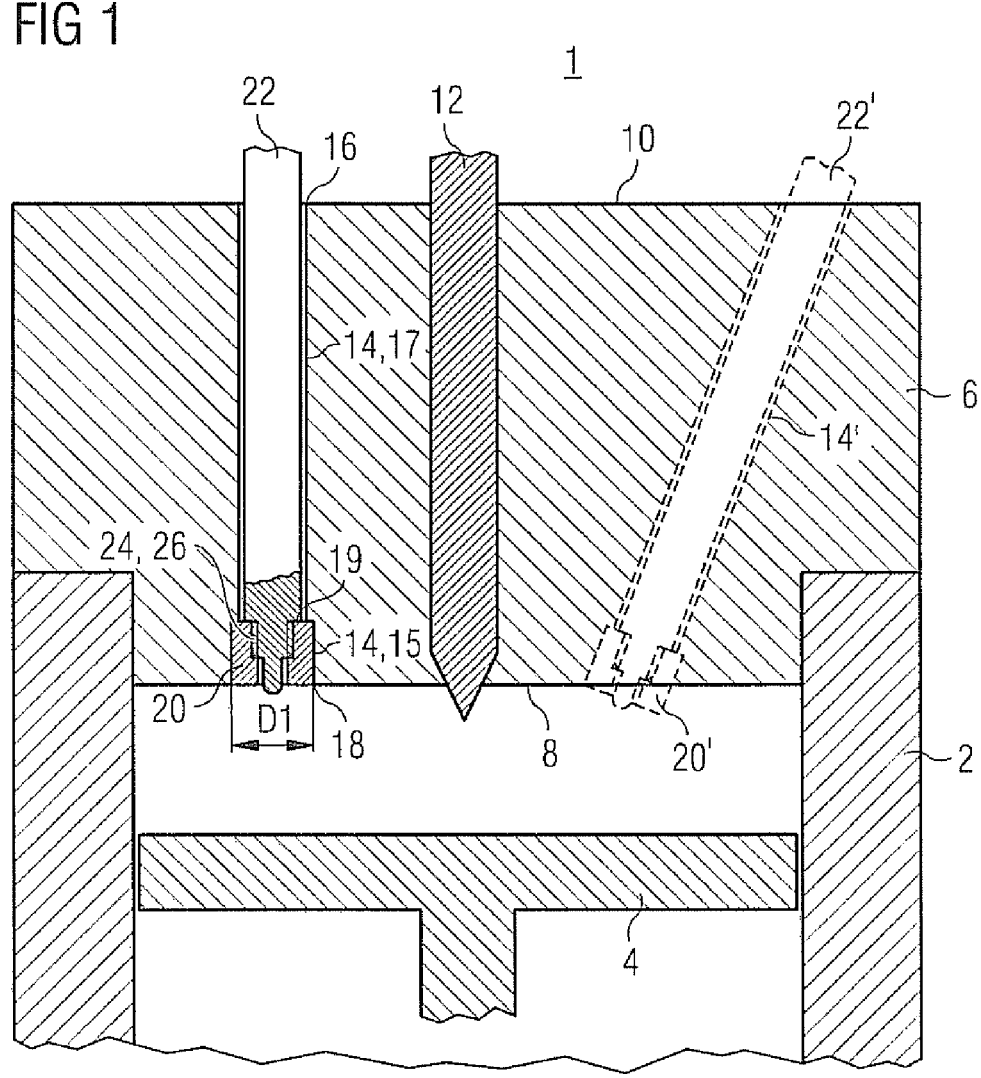
FIG. 1 is a schematic cut view of a cylinder unit.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that machining of a sensor seat and a thread for mounting a sensor within an opening extending through the cylinder head may require expensive special tooling. Further, the filigree sensor seat and thread structure may be not reliable machinable, for example, due to small opening diameters and a long length of the opening extending through the cylinder head.

Accordingly, a cylinder head comprising an opening and a pre-machined sensor sleeve shrink fitted in the opening, and adapted for mounting a sensor is disclosed.

An exemplary embodiment of a cylinder head 6 is described in the following with reference to FIG. 1 showing a cylinder unit 1.

Cylinder unit 1 of an internal combustion engine comprises a cylinder liner 2, a piston 4, and cylinder head 6.

Cylinder liner 2 may be arranged within an engine block. The engine block may comprise at least one cylinder unit 1.

Piston 4 is adapted to reciprocate within cylinder liner 2 during operation of internal combustion engine.

Cylinder head 6 is mounted onto cylinder liner 2, for example, via a plurality of bolts (not shown). Cylinder head 6 comprises a combustion zone face 8 directed to reciprocating piston 4 and a cover face 10. Cover face 10 is opposed to combustion zone face 8. Cover face 10 may be adapted to receive a cylinder cover.

Cylinder head 6 comprises an injection system 12. Injection system 12 is fluidly connected to a fuel supply system. Further, injection system 12 may be mechanically and/or electronically actuated to inject fuel into cylinder unit 1 upon actuation. A control unit may be connected to liquid injection system 12 to control quantity and timing of injection. The control unit may be part of an electronic control module (ECM) controlling operation of the internal combustion engine.

Cylinder head 6 further comprise at least one inlet valve and at least one outlet valve. The at least one inlet valve may be fluidly connected to an air intake system. The air intake system may comprise at least one air intake, for example, one for each cylinder of the internal combustion engine. The at least one outlet valve may be connected to an exhaust gas system. The exhaust gas system may comprise a particle filter, an exhaust gas recirculation line connected to the air intake system and/or a catalyst, for example, a SCR catalyst and/or an oxidation catalyst. Air intake system and exhaust gas system may be configured as a single-stage or two-stage turbo charged system.

Cylinder head 6 further comprises an opening 14, a sensor sleeve 20 shrink fitted in opening 14, and a sensor 22 mounted in the sensor sleeve 20.

Opening 14 extends through cylinder head 6 from an opening inlet 16 in cover face 10 to an opening outlet 18 in combustion zone face 8.

Opening 14 comprises a guiding section 17 and a mounting section 15. Guiding section 17 extends from cover face 10, and is adapted to guide sensor 22 in a mounted state. Mounting section 15 extends from combustion zone face 8, for example, along a length within the range of 10 mm to 50 mm, and is adapted for receiving sensor sleeve 20 by shrink fitting. Guiding section 17 has a different diameter than mounting section 15. Guiding section 17 and mounting section 15 are connected by inner shoulder 19.

Some embodiments may comprise guiding section 17 that extends from combustion zone face 8, and mounting section 15 that extends from cover face 10. Other embodiments of cylinder head 6 may comprise opening 14 having mounting section 15, without having guiding section 17

In some embodiments, mounting section 15 may be positioned in opening 14 without extending from either cover face 10 or combustion zone face 8.

Some embodiments may comprise one or more additional sections within opening 14.

Cylinder head 6 further comprises a sensor sleeve 20. Sensor sleeve 20 is shrink fitted in opening 14. Specifically, sensor sleeve 20 is shrink fitted in mounting section 15 of opening 14.

Mounting section 15 has an opening diameter D1. Opening diameter D1 comprises the same nominal dimension as an outer sleeve diameter D2 of sensor sleeve 20 as is described in greater detail later on with reference to FIG. 2.

In some embodiments, sensor sleeve 20 may be cryogenic shrink fitted in opening 14. Specifically, sensor sleeve 20 may be cryogenic shrink fitted in mounting section 15 of opening 14.

In some embodiments, opening 14 may extend through cylinder head 6 in a longitudinal direction or in an inclined direction as indicated by alternative or additional opening 14'.

Sensor sleeve 20 is adapted to receive and mount sensor 22. In some embodiments, sensor 22 may comprise an outer thread 26, and sensor sleeve 20 may comprise an inner thread 24 adapted to engage with outer thread 26 of sensor 22.

Sensor 22 is configured to sense an operation condition of the internal combustion engine. For example, sensor 22 may be configured to sense a pressure and/or temperature within cylinder unit 1. Sensor 22 is connected to a control unit, for example, the ECM controlling operation of the internal combustion engine.

Some embodiments may additionally or alternatively comprise a sensor 22' arranged within a sensor sleeve 20' in opening 14'.

Figure 2:
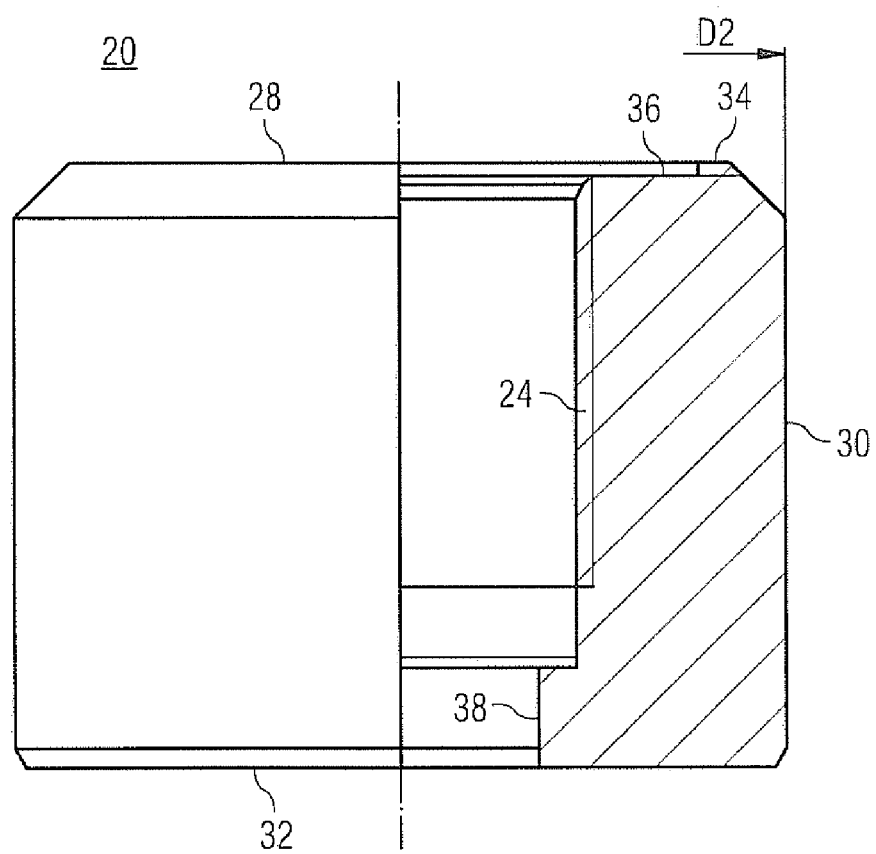
FIG. 2 is a schematic cut view of a sensor sleeve.

Turning to FIG. 2, a detailed view of an exemplary embodiment of sensor sleeve 20 is described in greater detail.

As already described with reference to FIG. 1, sensor sleeve 20 comprises an inner thread 24. Inner thread 24 is adapted to engage with outer thread 26 of sensor 22 (see FIG. 1). Inner and outer thread 24, 26 may be an ISO metric screw thread within the range of M8 to M20, for example, M14. It is noted that other embodiments may comprise additional or alternative mechanisms for mounting sensor 22 in sensor sleeve 20 known by those skilled in the art.

Sensor sleeve 20 further comprises an upper face 28, a circumferential face 30 and a lower face 32.

In a mounted state, upper face 28 contacts inner shoulder 19 of opening 14 (see FIG. 1).

In some embodiments, upper face 28 may comprise a sensor seat 36. Sensor seat 36 may provide a contact surface for a contact shoulder of sensor 22 in a mounted state of sensor sleeve 20 and sensor 22 in cylinder head 6. Sensor seat 36 and the contact shoulder may have a finish roughness that provides a fluid tight sealing between both in a mounted state.

In some embodiments, sensor sleeve 20 may further comprise one or more inner shoulders 38 for guiding sensor 22.

Circumferential face 30 of sensor sleeve 20 has an outer sleeve diameter D2. Outer sleeve diameter D2 and opening diameter D1 have the same nominal dimension. Outer sleeve diameter D2 has a different tolerance compared to opening diameter D1 to facilitate shrink fitting of sensor sleeve 20 into opening 14.

Circumferential face 30 provides a contact surface for an inner circumferential face of mounting section 15 of opening 14. Some embodiments may comprise circumferential face 30 and mounting section 15 that may have a finish roughness that provides a fluid tight sealing between both in a mounted state.

In some embodiments, sensor sleeve 20 may be made up of a high grade steel.

In some embodiments, outer sleeve diameter D2 and opening diameter D1 may have a nominal dimension within the range of 14 mm to 40 mm, for example, 28 mm.

Some embodiments may comprise an internal combustion engine that may comprise at least one cylinder unit 1. Each cylinder unit 1 may have a cylinder head 6 comprising opening 14, sensor sleeve 20 being shrink fitted in opening 14, and sensor 22 being mounted in sensor sleeve 20. Cylinder head 6 may cover cylinder liner 2 of cylinder unit 1.

INDUSTRIAL APPLICABILITY

When assembling a cylinder unit 1, cylinder liner 2 may be inserted into the engine block. Before mounting cylinder head 6 on cylinder liner 2, cylinder head 6 may be manufactured and prepared.

A method for manufacturing cylinder head 6 comprises, providing opening 14 extending through cylinder head 6. Opening 14 comprises mounting section 15 and may comprise further sections as described before. The method further comprises, providing sensor sleeve 20. Sensor sleeve 20 is shrink fitted into opening 14 of cylinder head 6.

The method step of shrink fitting sensor sleeve 20 into opening 14 may comprise cryogenic shrink fitting.

The method step of shrink fitting sensor sleeve 20 into opening 14 may comprise cooling or heating of sensor sleeve 20 and/or cylinder head 6 at least in a region of opening 14, for example, around mounting section 15.

The method step of shrink fitting sensor sleeve 20 into opening 14 may comprise, cooling sensor sleeve 20 with liquid nitrogen, inserting cooled sensor sleeve 20 into opening 14, and warming sensor sleeve 20 to ambient temperature such that sensor sleeve 20 is cryogenic shrink fitted in opening 14. Specifically, cooled sensor sleeve 20 is inserted in mounting section 15 of opening 14.

The method for manufacturing cylinder head 6 may further comprise pre-mounting injection system 12 in cylinder head 6, and machining inlet and outlet valve seats.

The method step of providing opening 14 may comprise, providing opening 14 with opening diameter D1, and the method step of providing sensor sleeve 20 may comprise providing sensor sleeve 20 with outer sleeve diameter D2. Opening diameter D1 and outer sleeve diameter D2 may have the same nominal dimension within the range of 10 mm to 40 mm.

The method of manufacturing cylinder head 6 may further comprise, mounting sensor 22 within sensor sleeve 20. Sensor 22 is configured to sense an operating condition of the internal combustion engine, for example a pressure or a temperature.

In some embodiments, sensor 22 may be mounted in sensor sleeve 20 when cylinder head 6 is already mounted onto cylinder liner 2.

The method step of providing sensor sleeve 20 may comprise providing inner thread 24 within sensor sleeve 20 and/or providing sensor seat 36 within sensor sleeve 20. Sensor 22 may comprise outer thread 26, and the step of mounting sensor 22 within sensor sleeve 20 may comprise screwing outer thread 26 of sensor 22 into inner thread 24 of sensor sleeve 20.

Herein, the term "internal combustion engine" may refer to internal combustion engines which may be used as main or auxiliary engines of stationary power providing systems such as power plants for production of heat and/or electricity as well as in ships/vessels such as cruiser liners, cargo ships, container ships, tankers, and other vehicles. Fuels for internal combustion engines may include diesel oil, marine diesel oil, heavy fuel oil, alternative fuels or a mixture thereof, and natural gas.

Although the preferred embodiments of this invention have been described herein, improvements and modifications may be incorporated without departing from the scope of the following claims.

The invention claimed is:

1. A cylinder head of an internal combustion engine, the cylinder head comprising:
   an opening extending through the cylinder head; and
   a sensor sleeve shrink fitted in the opening, the sensor sleeve including an inner thread.

2. The cylinder head of claim 1, wherein the sensor sleeve is cryogenically shrink fitted in the opening.

3. The cylinder head of claim 1, wherein the sensor sleeve comprises a sensor seat.

4. The cylinder head of claim 1, wherein:
   the opening has an opening diameter and the sensor sleeve has an outer sleeve diameter, the opening diameter and the outer sleeve diameter having the same nominal dimension within a range of 10 mm to 40 mm.

5. The cylinder head of claim 1, wherein the sensor sleeve is made of a high grade steel.

6. The cylinder head of claim 1, further comprising:
   a sensor comprising an outer thread engaging with the inner thread of the sensor sleeve, the sensor being configured to sense an operating condition of the internal combustion engine.

7. The cylinder head of claim 6, wherein the sensor is configured to sense at least one of a pressure and a temperature.

8. An internal combustion engine, comprising:
   a cylinder unit, the cylinder unit comprising a cylinder head, comprising:
   an opening extending through the cylinder head; and
   a sensor sleeve shrink fitted in the opening, the sensor sleeve including an inner thread.

9. The internal combustion engine of claim 8, wherein the sensor sleeve comprises a sensor seat.

10. The internal combustion engine of claim 8, wherein:
    the opening has an opening diameter and the sensor sleeve has an outer sleeve diameter, the opening diameter and the outer sleeve diameter having the same nominal dimension within a range of 10 mm to 40 mm.

11. The internal combustion engine of claim 8, comprising:
    a sensor comprising an outer thread engaging with the inner thread of the sensor sleeve, the sensor being configured to sense an operating condition of the internal combustion engine.

12. The internal combustion engine of claim 11, wherein the sensor is configured to sense at least one of a pressure and a temperature.

13. A method for manufacturing a cylinder head of an internal combustion engine, the method comprising:
    providing an opening extending through the cylinder head,
    providing a sensor sleeve with an inner thread; and
    shrink fitting the sensor sleeve into the opening of the cylinder head.

14. The method of claim 13, wherein shrink fitting the sensor sleeve into the opening of the cylinder head comprises:
    cooling the sensor sleeve with liquid nitrogen;
    inserting the cooled sensor sleeve into the opening; and
    warming the sensor sleeve to ambient temperature such that the sensor sleeve is cryogenically shrink fitted in the opening.

15. The method of claim 13, wherein:
    providing the opening comprises providing the opening with an opening diameter; and
    providing the sensor sleeve comprises providing the sensor sleeve with an outer sleeve diameter;
    wherein the opening diameter and the outer sleeve diameter have the same nominal dimension within a range of 10 mm to 40 mm.

16. The method of claim 13, further comprising:
    mounting a sensor within the sensor sleeve, the sensor being configured to sense an operating condition of the internal combustion engine.

17. The method of claim 16, wherein:
    providing the sensor sleeve comprises providing a sensor seat within the sensor sleeve; and
    mounting the sensor within the sensor sleeve comprises providing the sensor with an outer thread and screwing the outer thread of the sensor into the inner thread of the sensor sleeve.

18. The method of claim 16, wherein the sensor is configured to sense at least one of a pressure and a temperature.

* * * * *